US010684772B2

(12) United States Patent
Murakawa

(10) Patent No.: US 10,684,772 B2
(45) Date of Patent: Jun. 16, 2020

(54) DOCUMENT VIEWING APPARATUS AND PROGRAM

(71) Applicant: Konica Minolta, Inc., Chiyoda-ku, Tokyo (JP)

(72) Inventor: Akira Murakawa, Toyonaka (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 15/696,210

(22) Filed: Sep. 6, 2017

(65) Prior Publication Data

US 2018/0081535 A1 Mar. 22, 2018

(30) Foreign Application Priority Data

Sep. 20, 2016 (JP) ................................. 2016-182638

(51) Int. Cl.
G06F 3/0488 (2013.01)
G06F 40/106 (2020.01)
(Continued)

(52) U.S. Cl.
CPC ...... G06F 3/04883 (2013.01); G06F 3/04845 (2013.01); G06F 40/106 (2020.01);
(Continued)

(58) Field of Classification Search
CPC ........ G06F 3/0488; G06F 17/21; G06F 17/24; G06F 3/04883; G06F 40/166; G06F 40/171
See application file for complete search history.

(56) References Cited

U.S. PATENT DOCUMENTS 6,810,147 B2 * 10/2004 Kanemoto ............ G06F 40/171
382/189
8,942,489 B2 * 1/2015 Sesum ............... G06K 9/00469
382/229
(Continued)

FOREIGN PATENT DOCUMENTS

JP 07-078262 3/1995
JP 2007-316929 12/2007
JP 2013-171553 A 9/2013

OTHER PUBLICATIONS

Notice of Reasons for Refusal issued in corresponding Japanese Patent Application No. 2016-182638, dated Dec. 3, 2019 (8 pages).

Primary Examiner — Alvin H Tan
(74) Attorney, Agent, or Firm — Buchanan Ingersoll & Rooney PC

(57) ABSTRACT

A document viewing apparatus, having a touch screen, capable of receiving a handwritten input operation by the user in a state where a document image is displayed on a touch screen, a character string detection unit for detecting a character string included in the document image, a reference position determination unit that sets the reference position when an object is assigned to the character string in accordance with the operating position or operation trace of the handwritten input operation, a guide line drawing unit for drawing and displaying a guide line in accordance with an operation trace with respect to the reference position, and an object assignment unit that assigns a guide line as an object to the character string with the completion of the handwritten input operation.

21 Claims, 15 Drawing Sheets

(51) Int. Cl.
*G06F 40/166* (2020.01)
*G06F 40/171* (2020.01)
*G06F 3/0484* (2013.01)
*G06K 9/00* (2006.01)

(52) U.S. Cl.
CPC .......... *G06F 40/166* (2020.01); *G06F 40/171* (2020.01); *G06K 9/00442* (2013.01)

(56) References Cited

U.S. PATENT DOCUMENTS

| | | | | |
|---|---|---|---|---|
| 8,971,568 | B1* | 3/2015 | Smits | G06F 3/03545 |
| | | | | 382/100 |
| 9,256,588 | B1* | 2/2016 | Moscovich | G06F 40/171 |
| 9,430,141 | B1* | 8/2016 | Lu | G06F 17/241 |
| 2006/0050969 | A1* | 3/2006 | Shilman | G06F 3/04883 |
| | | | | 382/224 |
| 2006/0218484 | A1* | 9/2006 | Saito | G06F 17/241 |
| | | | | 715/236 |
| 2006/0221064 | A1* | 10/2006 | Sawada | G06F 17/241 |
| | | | | 345/173 |
| 2007/0208994 | A1* | 9/2007 | Reddel | G06F 17/2288 |
| | | | | 715/205 |
| 2007/0274704 | A1* | 11/2007 | Nakajima | G06F 17/242 |
| | | | | 396/310 |
| 2008/0091706 | A1* | 4/2008 | Suzuki | G06F 17/30637 |
| 2009/0052778 | A1* | 2/2009 | Edgecomb | G06F 3/03545 |
| | | | | 382/188 |
| 2012/0192056 | A1* | 7/2012 | Migos | G06F 17/241 |
| | | | | 715/230 |
| 2013/0229341 | A1* | 9/2013 | Yui | G06F 3/01 |
| | | | | 345/156 |
| 2014/0033132 | A1* | 1/2014 | Jain | G06F 3/04812 |
| | | | | 715/862 |
| 2014/0344662 | A1* | 11/2014 | Isabel | G06F 17/241 |
| | | | | 715/230 |
| 2015/0234588 | A1* | 8/2015 | Andersson | G06F 3/04883 |
| | | | | 382/187 |
| 2016/0147723 | A1* | 5/2016 | Lee | G06F 17/242 |
| | | | | 715/268 |
| 2016/0292501 | A1* | 10/2016 | Higashi | G06T 7/73 |
| 2016/0300321 | A1* | 10/2016 | Naya | G06K 9/00422 |
| 2017/0060829 | A1* | 3/2017 | Bhatt | G06F 17/241 |

* cited by examiner

*FIG. 12A*

An information processing device and a human body device make communication through the body of a person carrying the human body device. The information processing device performs user authentication based on user information received from the human body device.

*FIG. 12B*

An information processing device and a human body device make communication through the body of a person carrying the human body device. The information processing device performs user authentication based on user information received from the human body device.

DOCUMENT VIEWING APPARATUS AND PROGRAM

CROSS-REFERENCE TO RELATED APPLICATIONS

Japanese Patent Application No. 2016-182638 filed on Sep. 20, 2016 including description, claims, drawings, and abstract the entire disclosure is incorporated herein by reference in its entirety.

BACKGROUND

Technological Field

The present invention relates to a document viewing apparatus and program, and more particularly to a technology for assigning a marking, such as an underline to a document being viewed, based on a handwritten input operation by a user.

Description of the Related Art

In the related arts, technologies have been proposed to prevent lines in one display to another display from being shifted or interrupted when a handwritten input by a user is performed across a bezel region where images cannot be displayed with a handwritten input function in a display apparatus having more than one display such as disclosed in JP 2013-171553 A.

In recent years, documents are frequently viewed using a portable information terminal with a handwritten input function such as a smart phone or a tablet. In these situations, the user may underline or strikethrough a character string of a document being viewed using a handwritten input function of the portable information terminal. However, it is difficult to draw a straight underline or strikethrough line with a handwritten input operation on a character string displayed on a screen of a portable information terminal. For example, when a user wants to underline, the line may be drawn in the manner of a strikethrough line at the center of the character string. Conversely, when the user tries to draw a strikethrough line, the line may be drawn in a manner of an underline below the character string.

Therefore, in order to assist the user's handwritten input operation of an underline or strikethrough line based on, for example, the operation trace at the time the user releases their hand from the display screen and ends the handwritten input operation, a method by which the line inputted by the user is corrected to a straight line along the character string and assigning that straight line to the character string as an underline or a strikethrough line can be considered.

However, with the above-described method, it is necessary to specify in advance whether the line inputted by the handwritten input operation by the user is an underline or a strikethrough line. Therefore, there is a problem in usability when an underline or a strikethrough line is drawn while a user is viewing a document because it is necessary to designate whether it is an underline or a strikethrough before the handwritten input operation.

When most of the operation trace of the handwritten input operation performed by the user is located in the lower portion of a character string, it is automatically judged to be an underline. Conversely, when most of the operation trace is located in the upper portion of the character string, it is automatically judged to be a strikethrough line. However, in this case, there is a problem in usability in that it is unknown whether an underline or a strikethrough line will be displayed until the user completes the handwritten input operation.

SUMMARY

The present invention has been made to solve the above problems, and it is an objective of the present invention to provide a document viewing information processing apparatus and program such that the user is capable of determining what kind of object will be displayed as a result of a handwritten input operation while the handwritten input operation is being performed on a character string.

To achieve at least one of the abovementioned objects, according to an aspect of the present invention, a document viewing apparatus reflecting one aspect of the present invention comprises: a touch screen, capable of receiving a handwritten input operation by a user in a state where a document image is displayed on the touch screen, a character string detection unit for detecting a character string included in the document image, a reference position determination unit for assigning an object to the character string in accordance with the operating position or operation trace of the handwritten input operation performed on the character string, a guide line drawing unit for drawing and displaying a guide line corresponding to the operation trace with respect to the reference position, and an object assignment unit that assigns a guide line as an object to the character string in accordance with the completion of the handwritten input operation.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention.

FIGS. 12A and 12B are diagrams showing an assignment of a guide line and object when a handwritten input operation is performed over multiple rows of a character string.

DETAILED DESCRIPTION OF EMBODIMENTS

Figure 1:
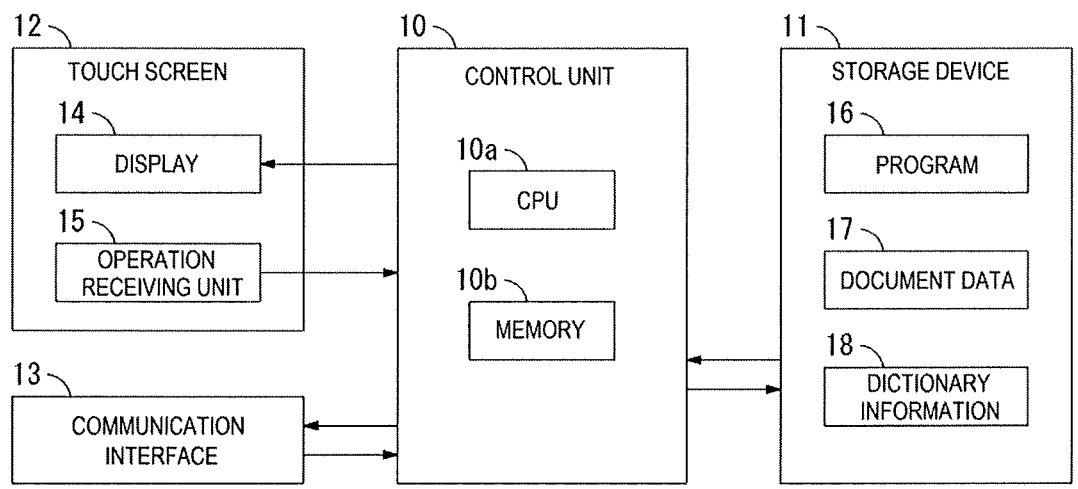
FIG. 1 is a diagram showing an example of a hardware configuration of a document viewing apparatus.

Hereinafter, one or more embodiments of the present invention will be described with reference to the drawings. However, the scope of the invention is not limited to the disclosed embodiments.

Preferred embodiments of the present invention will be described in detail below with reference to the drawings. In the embodiments to be described below, members that are common to each other are denoted by the same reference numerals, and redundant explanation thereof will be omitted.

FIG. 1 is a diagram showing an example of a hardware configuration of a document viewing apparatus 1 according to an embodiment of the present invention. The document viewing apparatus 1 is a device composed of, for example, a smart phone, a tablet terminal, or a personal computer. As shown in FIG. 1, the document viewing apparatus 1 includes a control unit 10, a storage device 11, a touch screen 12, and a communication interface 13. The control unit 10 is an arithmetic processing unit having a CPU 10a and memory 10b. The storage device 11 is a nonvolatile storage device consisting of, for example, a hard disk drive (HDD) or a solid state drive (SSD). The touch screen 12 serves as a user interface when the user uses the document viewing apparatus 1. The communication interface 13 is for communication between the document viewing apparatus 1 and other devices.

In the storage device 11, a program 16 to be executed by the CPU 10 a of the control unit 10 is stored in advance. The CPU 10a of the control unit 10 reads and executes the program 16, thereby controlling the operation of each unit. In the storage device 11, document data 17 that the user can view and edit is stored. Also, dictionary information 18 is stored in the storage device 11 as necessary.

The touch screen 12 includes a display unit 14 and an operation receiving unit 15. The display unit 14 is composed of, for example, a color liquid crystal display and displays a document image based on document data 17 specified by the user. The operation receiving unit 15 is composed of a touch screen sensor or the like arranged on the display screen of the display unit 14 and accepts a handwritten input operation by the user. The handwritten input operation may be performed with the fingertip of the user's hand or the pen tip of a stylus pen 5, as shown in FIG. 2, for example.

The document viewing apparatus 1 is connected to the network via the communication interface 13, acquires document data 17 from an external device via the network, and can save document data 17 in the storage device 11. Communication via the communication interface 13 may be wired communication or wireless communication.

Figure 2:
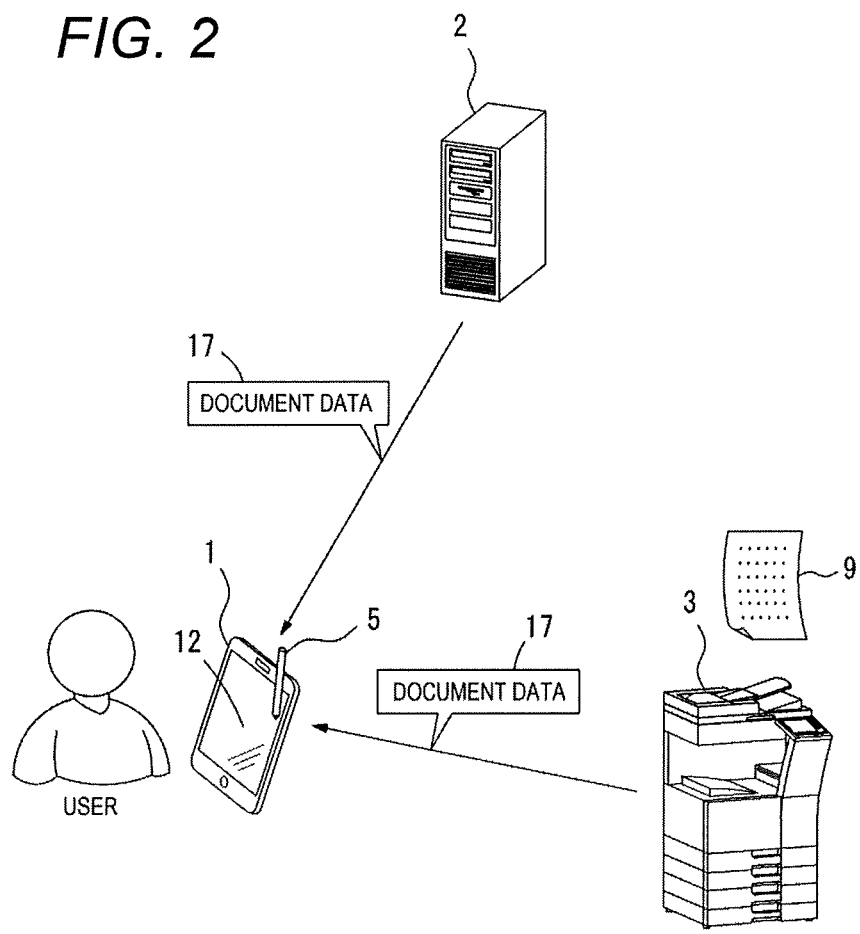
FIG. 2 is a diagram showing an example of a pathway for obtaining document data with the document viewing apparatus.

FIG. 2 is a diagram showing an example of a pathway for obtaining document data 17 with the document viewing apparatus 1. As shown in FIG. 2, the document viewing apparatus 1 can acquire document data 17 from the server 2, for example, by communicating with the server 2 storing document data 17. In this case, document data 17 is data in which character strings are represented by text data. However, the present invention is not limited to this, and document data 17 acquired from the server 2 may be image data in which character strings are embedded in an image.

Further, the document viewing apparatus 1 can perform coordinated operation with an image processing apparatus 3 having a scanning function such as those in MFPs (Multi-function Peripherals), for example. That is, the document viewing apparatus 1 can acquire, by using the scan function of an image processing apparatus 3, image data generated by reading an image of a document 9, as document data 17, from the image processing apparatus 3. In this case, document data 17 acquired by the document viewing apparatus 1 from the image processing apparatus 3 is image data in which character strings are embedded in the image.

However, the document viewing apparatus 1 is not necessarily limited to one that acquires document data 17 from an external device. For example, if the document viewing apparatus 1 is equipped with a document creating application, the document viewing apparatus 1 can also create document data 17 based on the document editing operation by the user if the document creating application is activated. Therefore, the document data 17 stored in the storage device 11 may be data created in the document viewing apparatus 1 by activating the document creating application.

Then, the document viewing apparatus 1 displays the document image based on the document data 17 stored in the storage device 11 on the display unit 14 so that the user can view the contents of the document data 17. When the document image based on the document data 17 is being displayed, the document viewing apparatus 1 accepts the handwritten input operation by the user, assigns various objects such as an underline and a strikethrough to character strings in the document image, and the document data 17 can be updated. Hereinafter, the function of the document viewing apparatus 1 will be described in detail.

Figure 3:
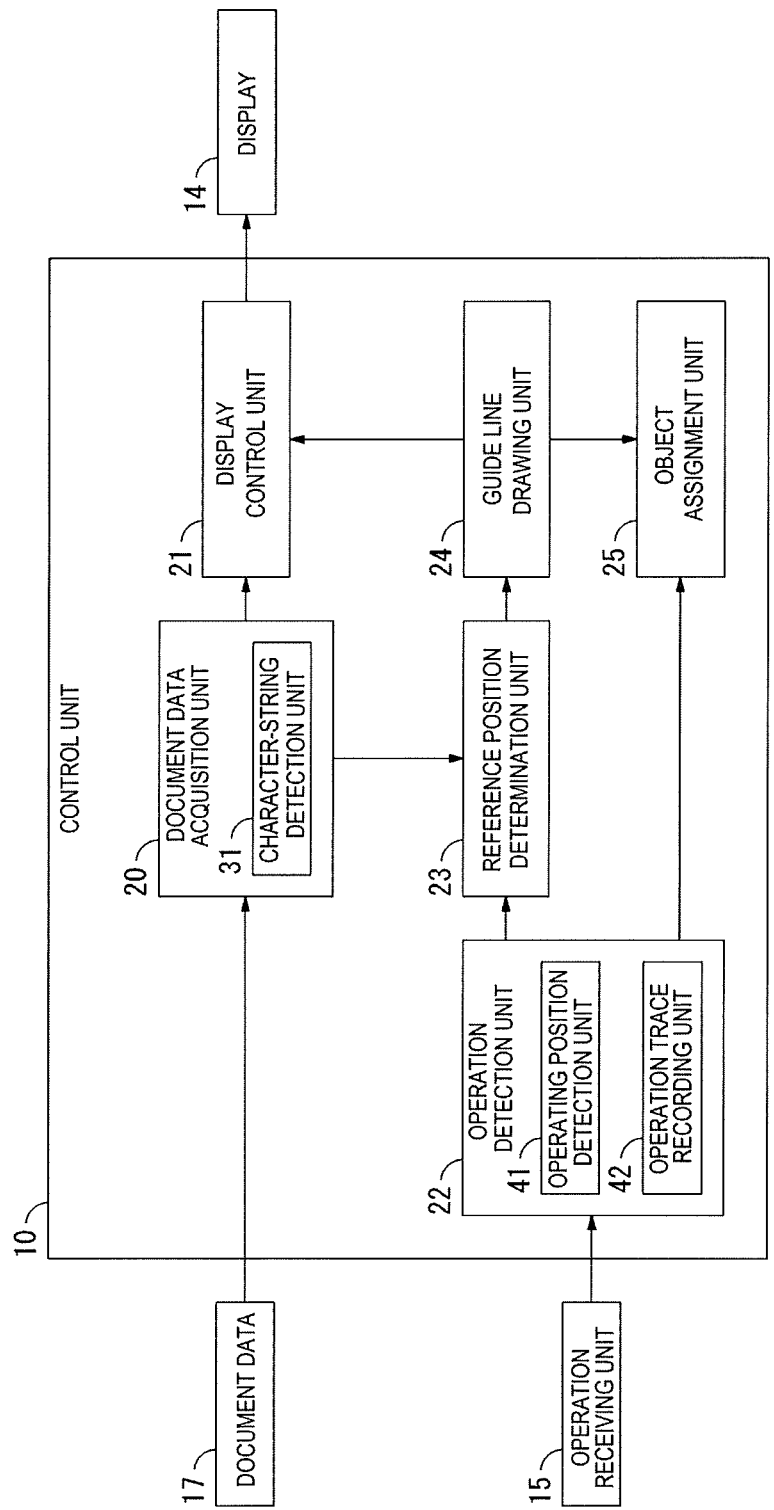
FIG. 3 is a block diagram showing an example of a functional configuration of the document viewing apparatus.

FIG. 3 is a block diagram showing an example of a functional configuration of the document viewing apparatus 1. For example, the CPU 10a of the control unit 10 reads and executes the program 16 from the storage device 11 based on instructions from the user. Thus, as shown in FIG. 3, the control unit 10 functions as a document data acquisition unit 20, a display control unit 21, an operation detection unit 22, a reference position determination unit 23, a guide line drawing unit 24, and an object assignment unit 25.

The document data acquisition unit 20 acquires document data 17 by reading the document data 17 from the storage device 11 specified as the display target by the user. The document data acquiring unit 20 has a character recognition function such as OCR (Optical character recognition), so when the document data 17 read from the storage device 11 is image data, character recognition processing is performed on the image data and converts character strings in the image into text data. When character strings are already represented by text data in the document data 17 read from the storage device 11, it is not necessary to perform such character recognition processing.

The document data acquisition unit 20 includes a character string detection unit 31. The character string detection unit 31 is a processing unit that detects character strings included in the document data 17. In particular, the character string detection unit 31 detects the position, size, arrangement direction, and the like of the character string in the document image. The character string detection unit 31 then outputs information such as the position, size, arrangement direction, and the like of the character string included in the document data 17 to the reference position determination unit 23.

Figure 4:
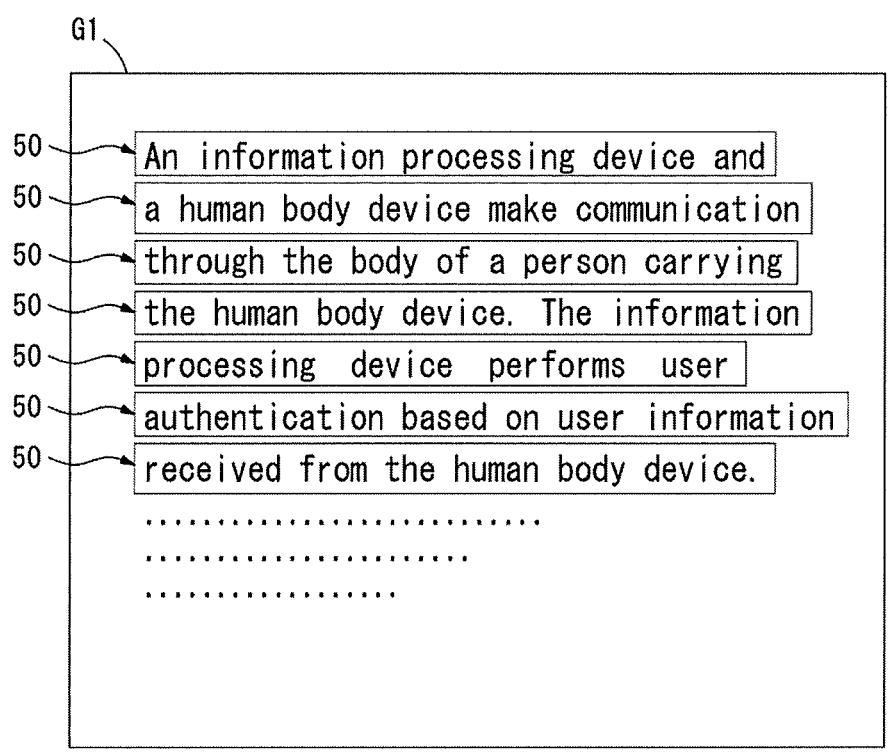
FIG. 4 is a diagram showing an example of a viewing screen.

The document data acquisition unit 20 outputs the document data 17 to the display control unit 21. The display control unit 21 then outputs the document image based on the document data 17 acquired by the document data acquisition unit 20 to the display unit 14 for display. As a result, the display unit 14 displays a document image viewing screen based on the document data 17. FIG. 4 is a diagram showing an example of the viewing screen G1. In the viewing screen G1 displayed on the display unit 14, a multi-row character string 50 may be displayed, as shown in FIG. 4, in some cases. Then, in a state in which the viewing screen G1 as shown in FIG. 4 is displayed, the user performs a handwritten input operation on the display screen of the display unit 14 so that any part of each character string 50 can be assigned an underline, a strikethrough line, or the like.

The operation detection unit 22 detects handwritten input operations by the user. The operation detection unit 22 includes an operating position detection unit 41 and an operation trace recording unit 42.

The operating position detection unit 41 detects the coordinates where the fingertip or pen tip is touching the operation receiving unit 15 as the current operating position. When the contact position of the fingertip or the pen point moves within the plane of the operation receiving unit 15 by the handwritten input operation of the user, the operating position detection unit 41 sequentially updates the current operating position. As the fingertip or the pen tip separates from the operation receiving unit 15, the operating position detection unit 41 detects that the handwritten input operation of the user has ended.

Figure 5:
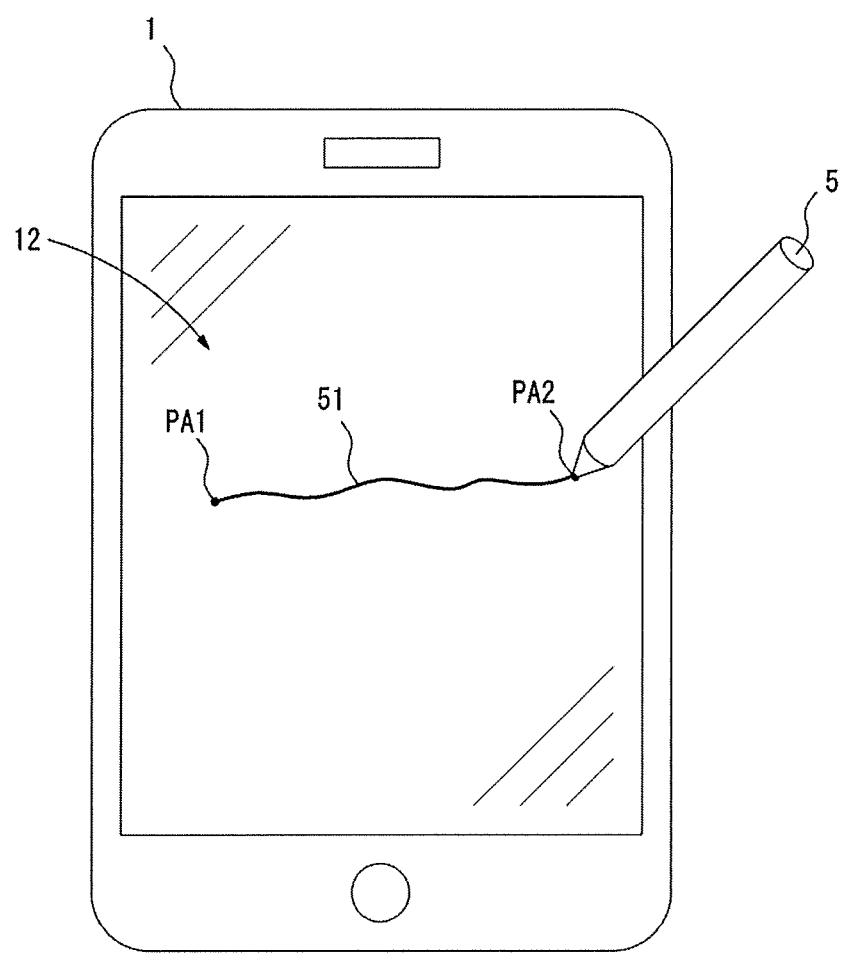
FIG. 5 is a diagram that describes an operation trace.

The operation trace recording unit 42 is a processing unit that sequentially records the operating positions detected by the operating position detection unit 41 during the period from the start to the end of the handwritten input operation of the user. FIG. 5 is a view for describing the operation trace. For example, as shown in FIG. 5, when the user performs a handwritten input operation using a stylus pen 5, the operation trace recording unit 42 records the position at which the pen tip of the stylus pen 5 contacts the surface of the touch screen 12 (that is, the operation receiving unit 15) as the operation start position PA1. Thereafter, as the pen tip moves, by recording the operating position sequentially detected by the operating position detection unit 41, the operation trace recording unit 42 records the operation trace 51 by the handwritten input operation. In the example of FIG. 5, the operation trace 51 from the operation start position PA1 to the current operating position PA2 is recorded by the operation trace recording unit 42. When the pen tip separates from the surface of the touch screen 12 in the state shown in FIG. 5, the operating position PA2 at that time is detected as the operation end position. When the pen tip moves further from the state shown in FIG. 5, the operation trace recording unit 42 records the trace associated with the movement of the pen tip and adds it to the operation trace 51.

The operation detection unit 22 outputs the current operating position PA2 detected by the operating position detection unit 41 and the operation trace 51 generated by the operation trace recording unit 42 to the reference position determination unit 23. When detecting that the handwritten input operation by the user has ended, the operation detection unit 22 notifies the object assignment unit 25 thereof.

Based on the operating position PA2 or the operation trace 51 input from the operation detection unit 22, the reference position determination unit 23 specifies which character string 50 is currently being displayed by the handwritten input operation of the user. The reference position determination unit 23 determines a reference position for assigning an object to the specified character string 50 according to the operating position PA2 or the operation trace 51 input from the operation detection unit 22. The reference position is determined, for example, by selecting from a first position below the character string, a second position at the center of the character string, or a third position above the character string. That is, when determining that the handwritten input operation by the user is an underlining operation of the character string 50, the reference position determination unit 23 sets the first position below the character string as the reference position. If the reference position determination unit 23 determines that the handwritten input operation by the user is an operation to assign a strikethrough line to the character string 50, the reference position determination unit 23 sets the second position at the center of the character string as the reference position. If the reference position determination unit 23 determines that the handwritten input operation by the user is an operation of assigning a border enclosing the character string 50, the reference position determination unit 23 sets both the first position below the character string and the third position above the character string as reference positions. Then, the reference position determination unit 23 outputs the reference position(s) based on the handwritten input operation by the user to the guide line drawing unit 24.

The guide line drawing unit 24 generates a guide line to be added to the reference position(s) set by the reference position determination unit 23, and by outputting the guide line to the display control unit 21, draws and displays the guide line on the display unit 14 with respect to the character string 50. The guide line drawing section 24 sets the start point and length of the guide line according to the operation trace 51 and draws the guide line corresponding to the handwritten input operation by the user. The guide line drawing unit 24 sequentially updates the guide line displayed on the display unit 14 as the handwritten input operation by the user is continuously performed. It should be noted that the guide line drawing unit 24 may simultaneously draw and display the operation trace 51 based on the handwritten input operation on the character string 50 when drawing and displaying the guide line for the character string 50.

Then, based on the guide line displayed when the handwritten input operation by the user is completed, the object assignment unit 25 definitively assigns an object such as an underline, a strikethrough line, a box or the like to the character string, and the document data 17 is updated.

Figure 6:
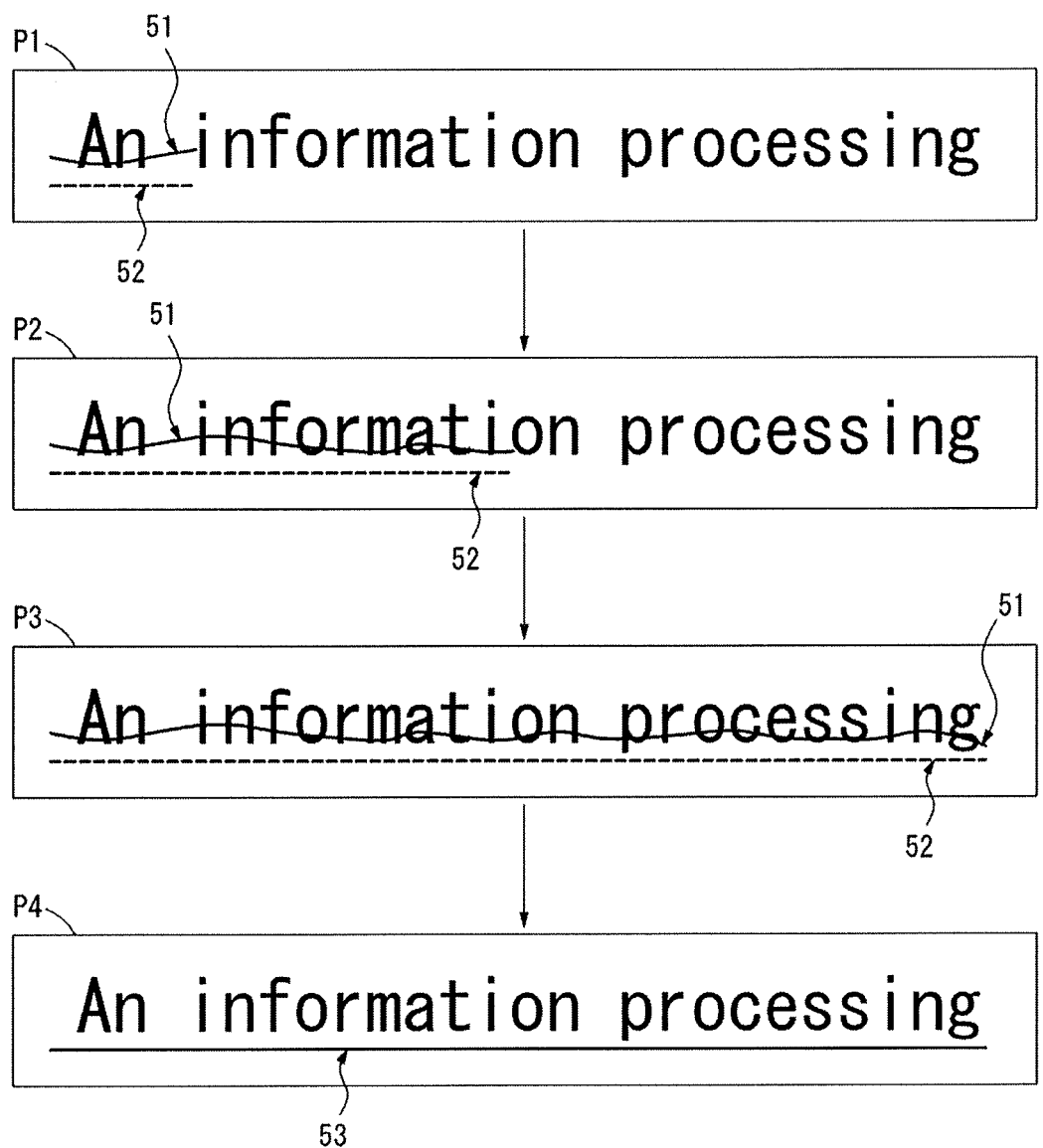
FIG. 6 is a diagram showing an example of a guide line displayed in addition to a character string in accordance with a handwritten input operation.

FIG. 6 is a diagram showing an example of the guide line 52 displayed in addition to the character string in accordance with the handwritten input operation by the user. Further, FIG. 6 is an enlarged view of a part of the character string displayed on the viewing screen G1. A case in which the reference position determination unit 23 sets the first position on the lower side of the character string as the reference position is shown as an example.

For example, when the user starts the handwritten input operation on the character string, the operation detection unit 22 detects the operation start position. As the user moves the contact position on the touch screen 12 along the character string, the operation trace 51 is generated accordingly. At this time, the guide line drawing unit 24 draws the guide line 52, with respect to the first position below the character string set as the reference position, having a length corresponding to the operation trace 51 starting from the operation start position (process P1). At this time, the guide line 52 is, for example, displayed as a broken line or displayed in gray so that the user can recognize that it is not set. Thereafter, when the user's handwritten input operation continues and the operation trace 51 further extends along the character string, the guide line drawing unit 24 causes the guide line 52 to extend parallel to the character string at the reference position of the character string (process P2). When the operation trace 51 continues to extend and the handwritten input operation by the user continues, the guide line drawing section 24 further continues to extend the guide line 52 straight along the character string (process P3). As the guide line 52 is sequentially extended in this way, the user can determine what kind of object is added to the character string during the handwritten input operation. Thereafter, when the user releases the pen tip or the like from the surface of the touch screen 12 to end the handwritten input operation, the object assignment unit 25 gives the object 53 to the character string based on the guide line 52 at the time of completion (process P4). At this time, the object 53, since it is definitively assigned to the character string, is switched from being displayed in a solid line mode to a dashed line mode, or from being displayed in gray mode to being displayed in a determined color mode. Accordingly, even when the user inputs a zigzag line by handwritten input operation, since the object 53 ultimately assigned to the character string is constituted by a line that is straight and parallel to the character string, it is possible to assign an object 53 of good appearance to the character string.

Figure 7:
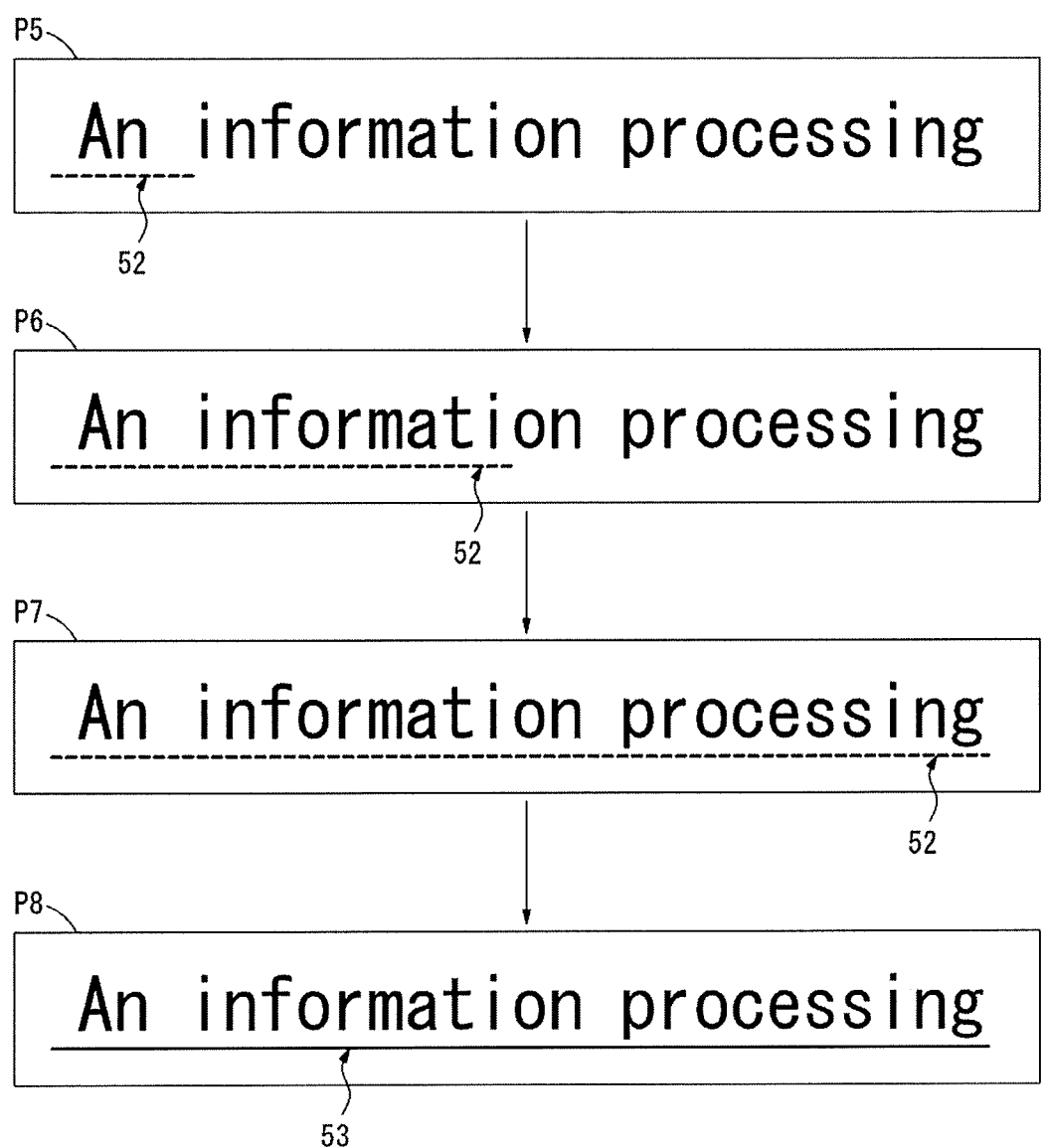
FIG. 7 is a diagram showing a display mode in which only the guide line is displayed.

In FIG. 6, a case in which the operation trace 51 is displayed on the display unit 14 as the handwritten input operation by the user progresses is shown as an example. However, the operation trace 51 by the handwritten input operation does not have to be displayed on the display unit 14. FIG. 7 is a diagram showing a display mode that displays only the guide line 52 in the same handwritten input operation as in FIG. 6. In this case, when the user starts the handwritten input operation on the character string and moves the contact position with respect to the touch screen 12 along the character string, the guide line drawing unit 24 extends the guide line 52 as the contact position moves (processes P5 to P7). Also in this case, the user can determine what kind of object is being added to the character string while continuing the handwritten input operation. Thereafter, when the user releases the pen tip or the like from the surface of the touch screen 12 to finish the handwritten input operation, the object assignment unit 25 assigns the object 53 to the character string on the basis of the guide line 52 drawn at that time (process P8).

Figure 8A:
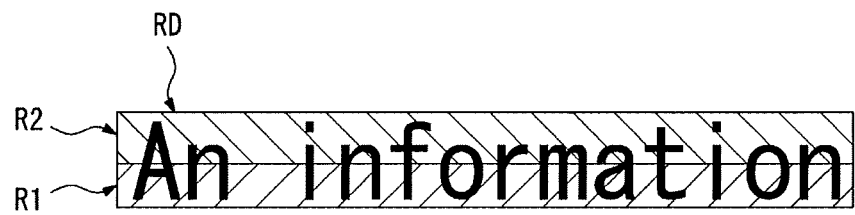
FIGS. 8A-8D are diagrams illustrating a method for determining a reference position.

Next, a method of setting the reference position with the reference position determination unit 23 will be described. FIG. 8 is a diagram that describes a method for setting a reference position. First, as shown in FIG. 8A, the reference position determination unit 23 specifies the character string display area RD based on the position, size and arrangement direction of the character string detected by the character string detection unit 31. The display region RD is a band-shaped region that encloses a character string and extends in the arrangement direction of the character string. For example, as shown in FIG. 4, when there is a multiple-row character string 50 in the viewing screen G1, the reference position determination unit 23 specifies a character string display area RD for each row. The reference position determination unit 23 then partitions the display region RD of each character string into a first region R1 and a second region R2 by a dividing line extending parallel to the arrangement direction of the character string. In the example of FIG. 8A, the first region R1 is set to the bottom portion of the display region RD of the character string, and the second region R2 is set to the upper portion of the display region RD of the character string. For example, the reference position determination unit 23 equally divides the display region RD of each character string in the width direction of the character string (the character height direction) so that the first region R1 and the second region R2 are partitioned equally.

Figure 8B:
Figure 8C:
Figure 8D:

Then, for example, when the operating position PA2 of the handwritten input operation performed on the character string is inside the first region R1, the reference position determination unit 23 sets, as shown in FIG. 8B, the first position BP1, below the character string, as the reference position. When the operating position PA2 of the handwritten input operation performed on the character string is inside the second region R2, for example, as shown in FIG. 8C, the reference position determination unit 23 sets the second position BP2, at the center of the character string, as the reference position. Further, when detecting an operation trace 51 that encloses a character string display area RD as described later, the reference position determination unit 23 sets the first position BP1 below the character string and the third position BP3 above the character string as reference positions, as shown in FIG. 8D.

The reference positions are set so as to extend parallel to the arrangement direction of the character string. Therefore, even if the document data 17 is data generated by the scan function of an image processing apparatus 3 and the character string is oriented slightly obliquely in the image plane of the document image, the reference position is set to a position matching the inclined direction of the character string.

Figure 9:
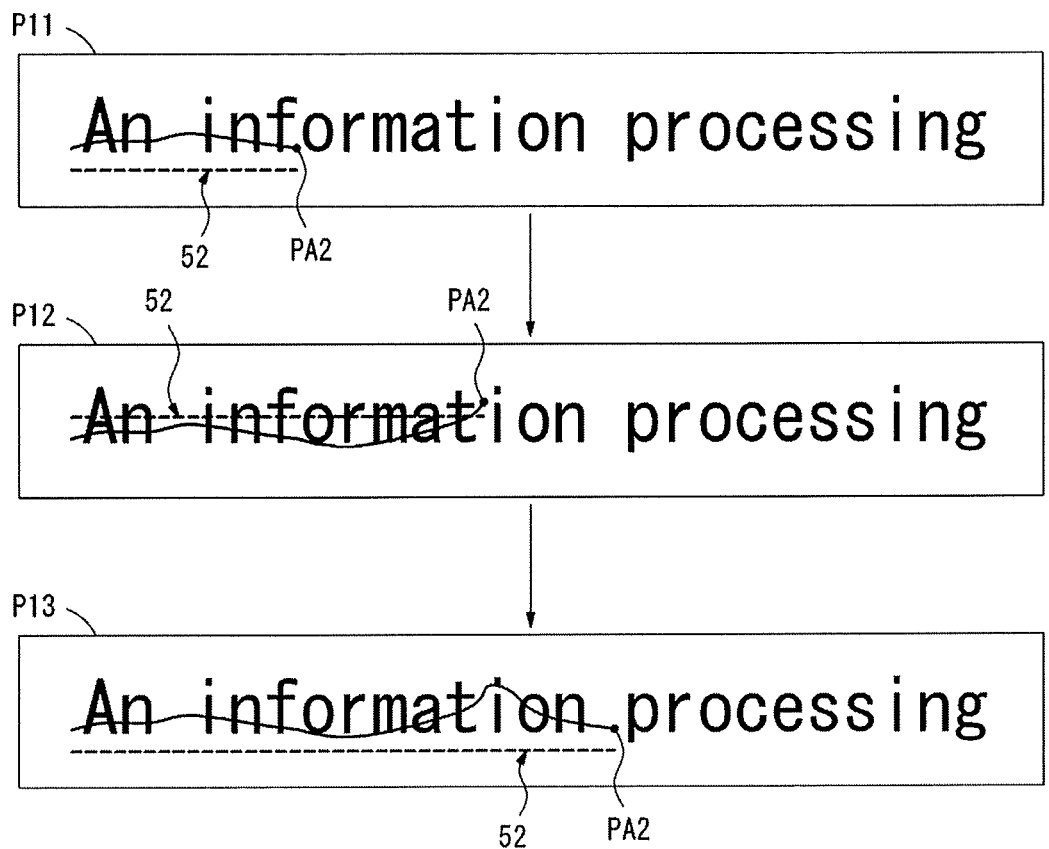
FIG. 9 is a drawing showing an example of a guide line being drawn based on the current operating position during a handwritten input operation.

FIG. 9 is a diagram that shows an example of drawing a guide line 52 based on the current operating position PA2 of the handwritten input operation. When the handwritten input operation by the user is started, and the operation start position is inside the first region R1 provided on the lower portion of the character string display region RD, as described above, the first position BP1 below the character string is set as the reference position. Hence, at the start of the handwritten input operation, the guide line 52 is displayed at the first position BP1 below the character string. As the operating position PA2 moves to the right along the character string while the operating position PA2 of the handwritten input operation is inside the first region R1, the guide line 52 moves below the character string and extends to the right of the first position BP1 (process P11).

Thereafter, as the operating position PA2 of the handwritten input operation moves from the first region R1 to the second region R2, the reference position for displaying the guide line 52 is switched accordingly from the first position BP1 to the second position BP2. As a result, when the operating position PA2 enters the second region R2, the guide line 52 displayed with respect to the character string is erased from the first position BP1 and switches to a state in which it is displayed at the second position BP2 (process P12). Accordingly, when the user completes the handwritten input operation in this state, the user can determine that a strikethrough line is assigned to the character string. At this time, if the user wishes to assign an underline to the character string, an operation to move the current operating position PA2 to the area below the character string may be performed. When the operating position PA2 of the handwritten input operation returns from the second region R2 to the first region R1, the reference position for displaying the guide line 52 switches again from the second position BP2 to the first position BP1. Consequently, the guide line 52, to be displayed with the character string, is erased from the second position BP2 at the moment the operating position PA2 enters the first region R1 and switches to a state in which it is re-displayed in the first position BP1 (process P13). In this way, since the user can confirm the guide line 52 to be drawn with the character string while performing a handwritten input operation, the user can correct subsequent handwritten input operation at the moment an unintended guide line 52 is displayed. As a result, with the desired guide line 52 in the displayed state, users can complete the handwritten input operation and reduce the number of re-dos.

The reference position determination unit 23 sets the reference position according to whichever region, the first region R1 or the second region R2, that the operation trace 51 of the handwritten input operation by the user is included in more. That is, the reference position determination unit 23 sets the first position BP1 of the character string as the reference position when the operation trace 51 of the handwritten input operation is inside the first region R1 more than in the second region R2; and sets the second position BP2 of the character string as the reference position when the operation trace 51 is inside the second region R2 more than in the first region R1.

Figure 10:
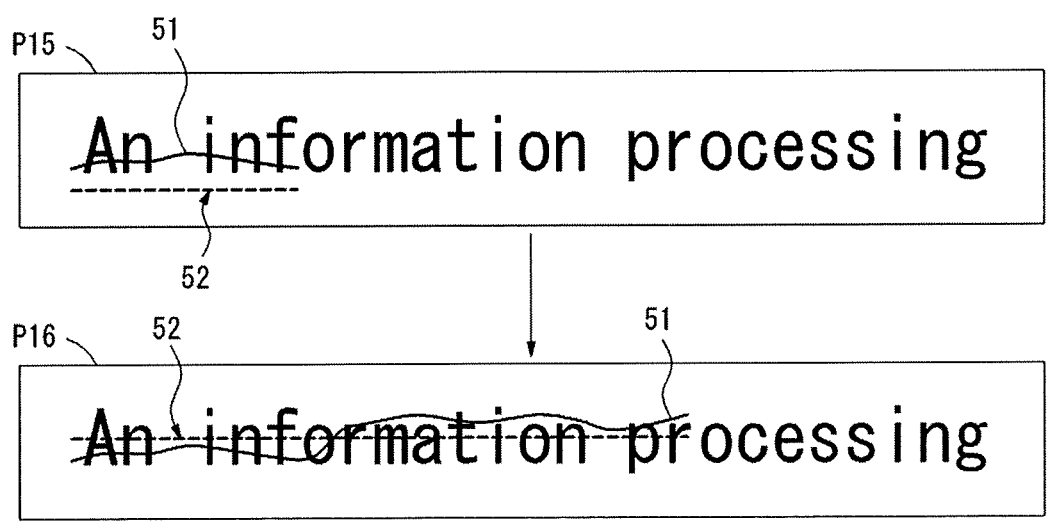
FIG. 10 is a drawing showing an example of drawing a guide line based on an operation trace of a handwritten input operation.

FIG. 10 is a diagram showing an example of drawing the guide line 52 based on the operation trace 51 of the handwritten input operation. When the operation trace 51 sequentially derived after the start of the handwritten input operation is inside the first region R1, the reference position determination unit 23, the first position BP1 below the character string is set as the reference position (process P15). Thereafter, if the operating position PA2 handwritten input operation by the user is moved to the second region R2 and the handwritten input operation in the second region R2 progresses, the operation trace 51 in the second region R2 becomes longer than the operation trace 51 in the first region R1. At this time, the reference position determination unit 23 sets the second position BP2 of the center of the character string as a reference position. Thus, at the moment the operation trace 51 in the second region R2 becomes longer than the operation trace 51 in the first region R1, the guide line 52 to be displayed with the character string is erased from the first position BP1 and switched so that it is displayed at the second position BP2 (process P16). Accordingly, when the user completes the handwritten input operation in this state, the user can determine that a strikethrough line is assigned to the character string.

Figure 11:
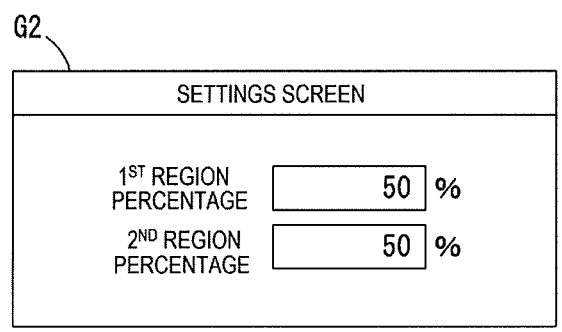
FIG. 11 is a diagram showing an example of a settings screen.

The reference position determining section 23, when partitioning the display region RD of the character string into a first region R1 and a second region R2, the first region R1 and the second region R2 can be partitioned according to percentages set beforehand by the user. FIG. 11 is a diagram showing an example of a settings screen G2 displayed on the display unit 14 when the user sets the percentages of the first region R1 and second region R2 in advance. In the settings screen G2, for example, the user can freely change the percentages of the first region R1 and second region R2. For example, as the user increases the percentage of the first region R1 to greater than 50%, the percentage of the second region R2 decreases accordingly to less than 50%. Consequently, the first region R1 of the lower portion in the display region RD of the character string becomes larger than the second region R2 of the upper portion. Conversely, as the user decreases the percentage of the first region R1 to less than 50%, the percentage of the second region R2 increases accordingly to higher than 50%. Consequently, the first region R1 of the lower portion in the display region RD of the character string becomes smaller than the second region R2 of the upper portion. That is, when the percentage of either the first region R1 or the second region R2 is set by the user, the document viewing apparatus 1 automatically sets the percentage of the other region so that the sum of the percentages of the first region R1 and second region R2 becomes 100%. Therefore, for example, if a user often uses an underline for character strings and seldom uses a strikethrough line, by setting the percentage of the first region R1 to a value larger than that of the second region R2, an advantage is afforded in which performing the handwritten input operation for underlining becomes easier.

The handwritten input operation by the user, without interruption, is sometimes performed over a multi-row character string 50. For this purpose, when a handwritten input operation by the user is performed over a multi-row character string 50, the reference position determination unit 23 sets reference positions for each row of the multi-row character string 50 based on the current operating position PA2 of the handwritten input operation.

FIG. 12 is a diagram showing the guide line 52 and assignment of object 53 when a handwritten input operation is performed over a multi-row character string 50. First, as shown in FIG. 12A, the user performs a handwritten input operation from the beginning to the end of the first row of the character string of a multi-row character string 50, then crosses multiple lines of text, and it is supposed that the operating position PA2 is moved to the end of the seventh line. In this case, the reference position determination unit 23, with the operating position PA2 of the handwritten input operation by the user crossing multiple lines of text, the character strings of the multiple rows are additionally set as reference position targets. The reference position determination unit 23 specifies the character string to which the current operating position PA2 is located, and determines which of either the first region R1 or the second region R2 the operating position PA2 in the display region RD of the specified character string is in. As a result, if the operating position PA2 is inside the first region R1, the reference position determination unit 23, the first position BP1 is set as the reference position for each of the rows of the multi-row character string 50 crossed by the handwritten input operation. That is, in this case, as shown in FIG. 12A, a guide line 52 that corresponds to an underline for each row of the multi-row character string 50 is displayed. When the user completes the handwritten input operation while the guide line 52 that corresponds to the underline for each of the rows of the multi-row character string 50 is being displayed, the guide line 52, as shown in FIG. 12B, switches to the solid underline object 53 and is displayed.

In contrast, if the operating position PA2 of the handwritten input operation performed across a multi-row character string is inside the second region R2 of one character string, the reference position determination unit 23, the second position BP2 is set as the reference position for each of the rows of the multi-row character string 50 crossed by the handwritten input operation. In this case, a guide line 52 that corresponds to a strikethrough line for each row of the multi-row character string 50 is displayed.

Thus, the reference position determination unit 23 sets the reference position for each row of the multi-row character string 50, when the handwritten input operation is performed across the multi-row character string 50. The guide line drawing unit 24, when the reference positions for each of the rows of the multi-row character string 50 are set by the reference position determination unit 23, a guide line 52 corresponding to the underline or strikethrough line for the multi-row character string 50 is drawn and displayed. Thus, when the user adds an underline or strikethrough to a multi-row string 50, it is not necessary to perform a handwritten input operation line by line separately and operability is remarkably improved.

Figure 13A:
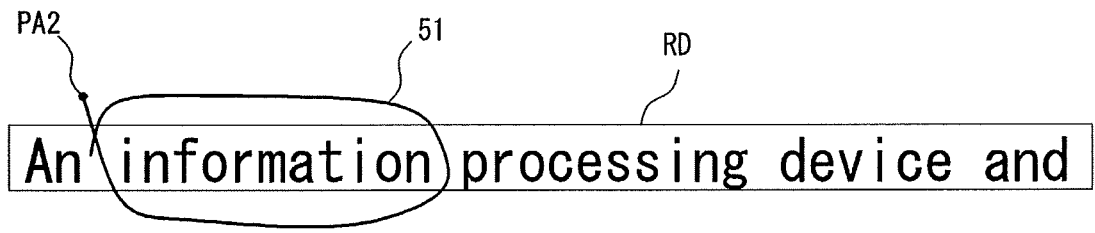
FIGS. 13A-13D are diagrams showing an example of a guide line displayed when an operation trace enclosing a display region of a character string is detected.
Figure 13B:
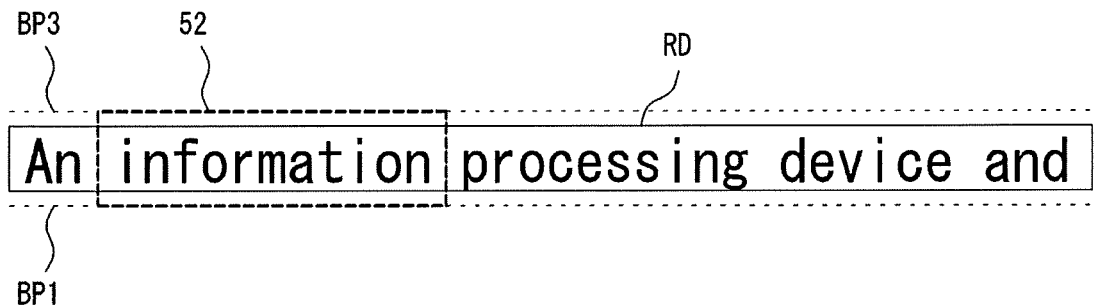
Figure 13C:
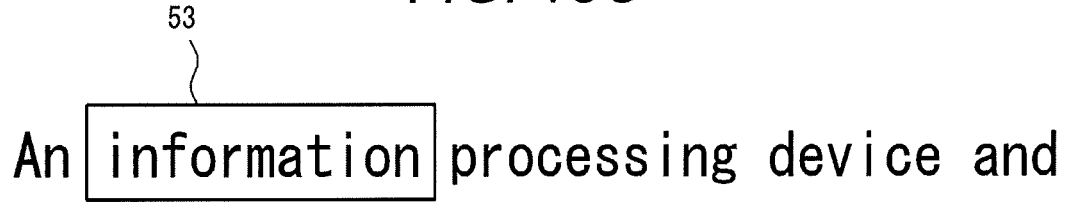

The reference position determining section 23, when detecting the operation trace 51 enclosing the display region RD of the character string, it is determined that the object assigned to the character string is an enclosing border. In this case, the reference position determination unit 23, as shown in FIG. 8D, sets both a first position BP1 and a third position BP3 as reference positions when drawing the guide line 52. FIG. 13 is a diagram showing an example of a guide line 52 that is displayed when an operation trace 51 enclosing the display region RD of the character string. For example, when the handwritten input operation as shown in FIG. 13A is performed, the reference position determination unit 23 detects, based on the operation trace 51, an operation to enclose the display region RD of the character string has been performed. At this time, the reference position determination unit 23, as shown in FIG. 13B, sets a first position BP1 below the character string and a third position BP3 above the character string as reference positions. With this, the guide line drawing unit 24, based on the operation trace 51, draws and displays a rectangular guide line 52 having one side in each of the first position BP1 and the third position BP3. By having this rectangular guide line 52 displayed, the user can confirm that the enclosing border surrounding the display region RD of the character string by their handwritten input operation has been assigned. Thereafter, when the user completes the handwritten input operation, the object assignment unit 25 becomes operational. The object assignment unit 25, as shown in FIG. 13C, displays the object 53 of the enclosing border with respect to the position where a rectangular guide line 52 has been displayed, and the object 53 is definitively assigned to the character string. At this time, because the enclosing border object 53 is assigned to contain the character string, it is possible to prevent the visibility of the character string from diminishing by the object 53.

Figure 13D:
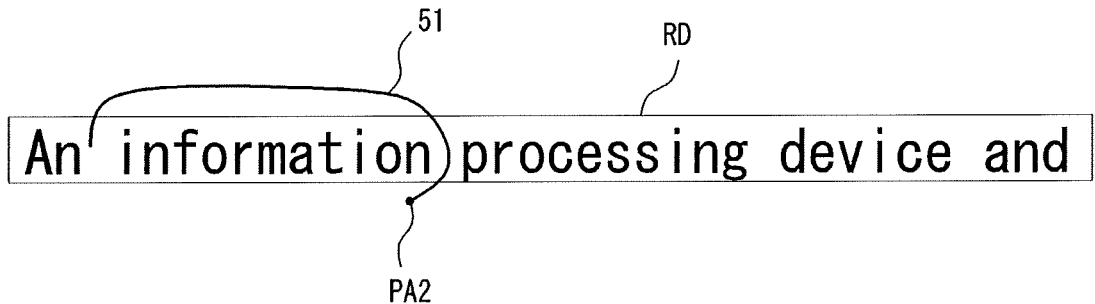

In the above example, when the operation trace 51 of the handwritten input operation is detected to have intersected itself, as shown in FIG. 13A, the reference position determination unit 23 determines that an operation that encloses the character string has been performed. However, the function of the reference position determination unit 23 is not limited to this. For example, as shown in FIG. 13D, when the operation trace 51 of the handwritten input operation is detected to have gone outside of the display region RD and looped back toward the operation start position PA1 of the character string, the reference position determination unit 23 may determine that an operation that encloses the character string has been performed. In this case, the operating position PA2 of the handwritten input operation is advanced to the position shown in FIG. 13D so that the guide line 52 of the enclosing border, as shown in FIG. 13B, is displayed. Accordingly, if the user assigns an enclosing border object 53 to a character string, even after the handwritten input operation is completed at the moment of looping back toward the operating position PA2, the desired object 53 is assigned to the character string and it will be possible to perform a handwritten input operation efficiently.

Further, it is also possible for the reference position determination unit 23 to detect a looping back within the display region RD of the operation trace 51 of the handwritten input operation performed in the display region RD of the character string. In this case, the reference position determination unit 23 determines that the object 53 that the user is trying to assign to the character string is a double line. If the reference position determination unit 23 determines that the object 53 is a double line, it notifies the guide line drawing unit 24. The guide line drawing unit 24, with the reference position determination unit 23 setting the object 53 as a double line, draws and displays the guide line 52 displayed with the character string as a double line.

Figure 14A:
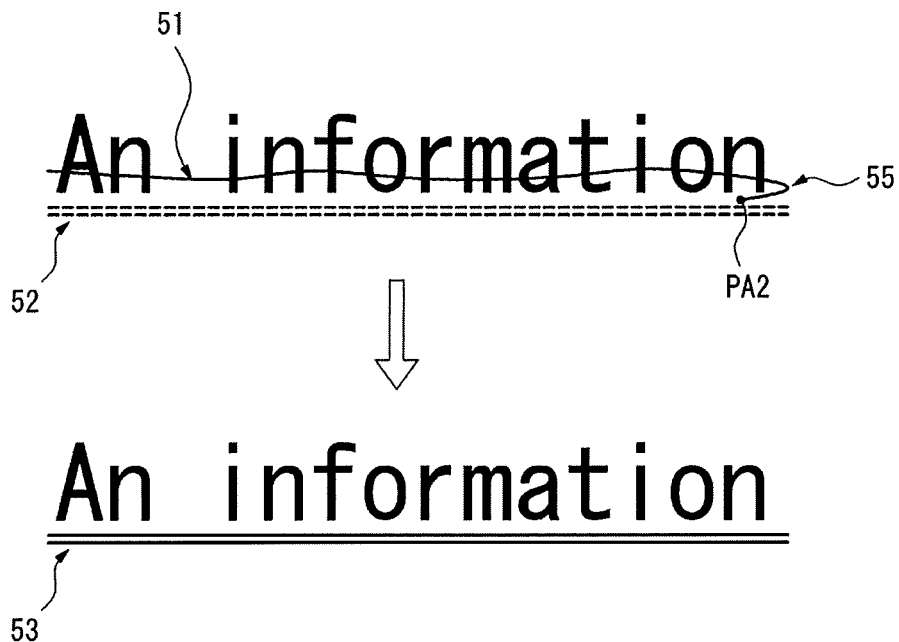
FIGS. 14A-14B are diagrams showing an example in which a double-line guide line is displayed.

FIG. 14 is a diagram showing an example of a displayed double-line guide line 52. For example, as shown in FIG. 14A, while the operation trace 51 of the handwritten input operation is inside the first region R1 of the display region RD of the character string, the reference position determination unit 23 sets the double line as the object 53 when it detects a looping back 55 of the operation trace 51. With this, the underline guide line 52 displayed below the character string is changed to a double line by the guide line drawing unit 24. Therefore, without the user returning the operating position PA2 to the operation start position PA1, and even after handwritten input operation is completed at the moment a double line guide line 52 is displayed, a double-line underline object 53 is assigned to the character string. Accordingly, the user will be able to perform a handwritten input operation efficiently when assigning a double-line underline to a character string.

Figure 14B:
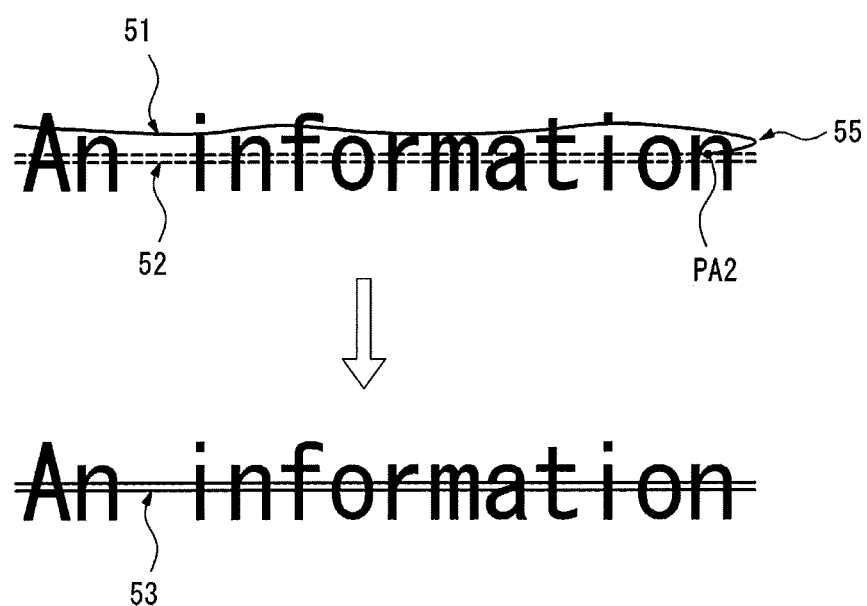

Further, as shown in FIG. 14B, while the operation trace 51 of the handwritten input operation is inside the second region R2 of the display region RD of the character string, the reference position determination unit 23 sets the double line as the object 53 when it detects a looping back 55 of the operation trace 51. With this, the guide line 52 strikethrough displayed in the center of the string by the guide line drawing unit 24 is changed to a double line. Accordingly, without the user returning the operating position PA2 to the operation start position PA1, and even after handwritten input operation is completed at the moment a double line guide line 52 is displayed, a double-line strikethrough line object 53 is assigned to the character string. Accordingly, the user will be able to perform a handwritten input operation efficiently when assigning a double strikethrough line to a character string.

Figure 15A:
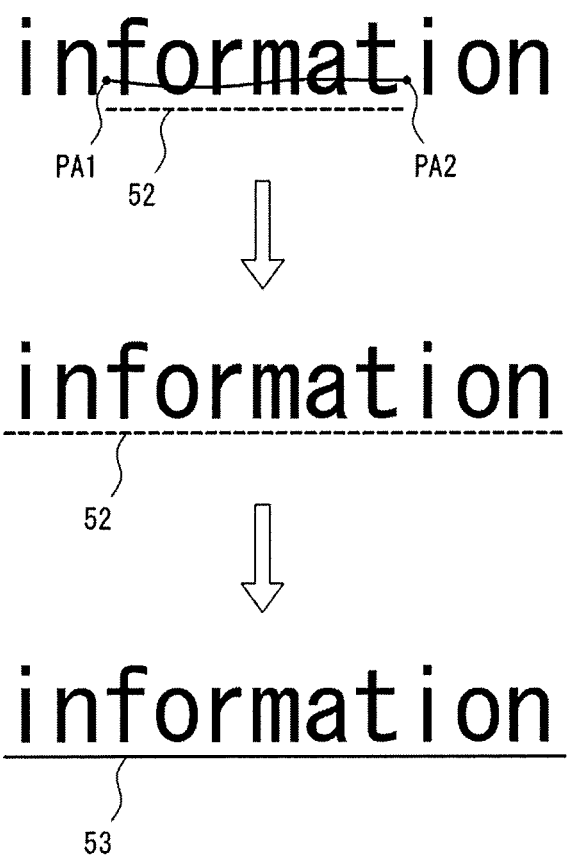
FIG. 15A is a diagram showing an example in which the start point or end point of a guide line is displayed coinciding with a break of a word.

The guide line drawing unit 24, when drawing and displaying a guide line 52 for a character string, the start point or end point of the guide line 52 may be made to coincide with the break between words in a character string. FIG. 15A is a diagram illustrating an example of a display of the start point or end point of the guide line 52 made to coincide with the breaks in a word. For example, as shown in FIG. 15A, if the operation start position PA1 and the current operating position PA2 of the handwritten input operation is in the middle of a word, the guide line drawing unit 24 displays the start and end points of the guide line 52 so that they coincide with both end positions of the word. When a handwritten input operation of the user is completed, the object assignment unit 25 assigns an object 53 to the character string based on the guide line 52 displayed at that time. Accordingly, when the user starts a handwritten input operation from the middle of a word, even if that handwritten input operation is terminated in the middle of a word, the object 53 assigned to the word is applied to the whole word and it is possible to impart an object 53 of good appearance.

For example, when the guide line drawing unit 24 detects a space, period, or colon, etc. as a word break in the vicinity of the operation start position PA1 and current operating position PA2, the guide line 52 is extended to the break of the word. However, not limited thereto, the guide line drawing unit 24, by referring to the dictionary information 18 stored in the storage unit 11 and identify the word at the operation start position PA1 or the current operating position PA2, based on the word identified, it may detect a break in the word. For example, in a Japanese document, where there are no spaces, periods, or colons, etc. as word breaks, by referring to the dictionary information 18, it is possible to accurately detect the breaks of the words.

Figure 16:
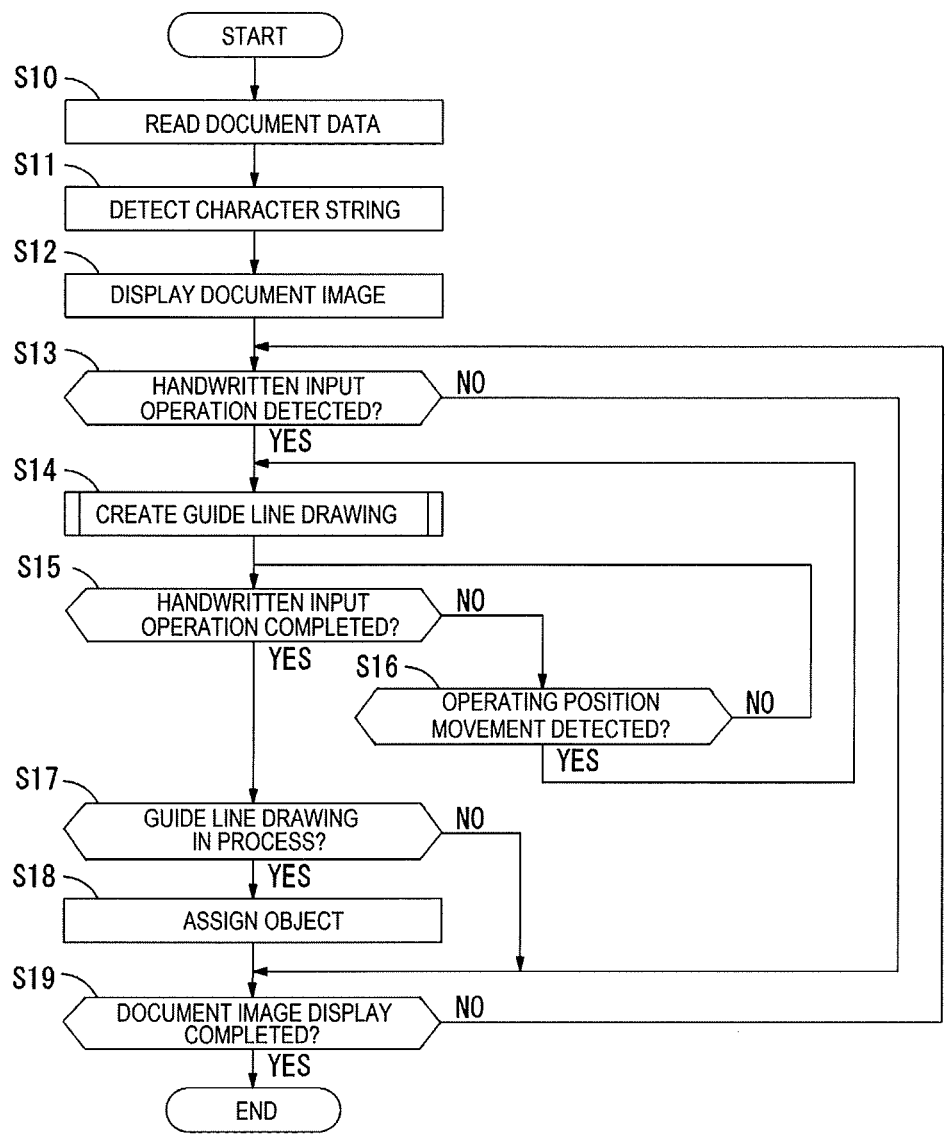
FIG. 16 is a flowchart illustrating an example of the main processing procedure performed in the document viewing apparatus.
Figure 17:
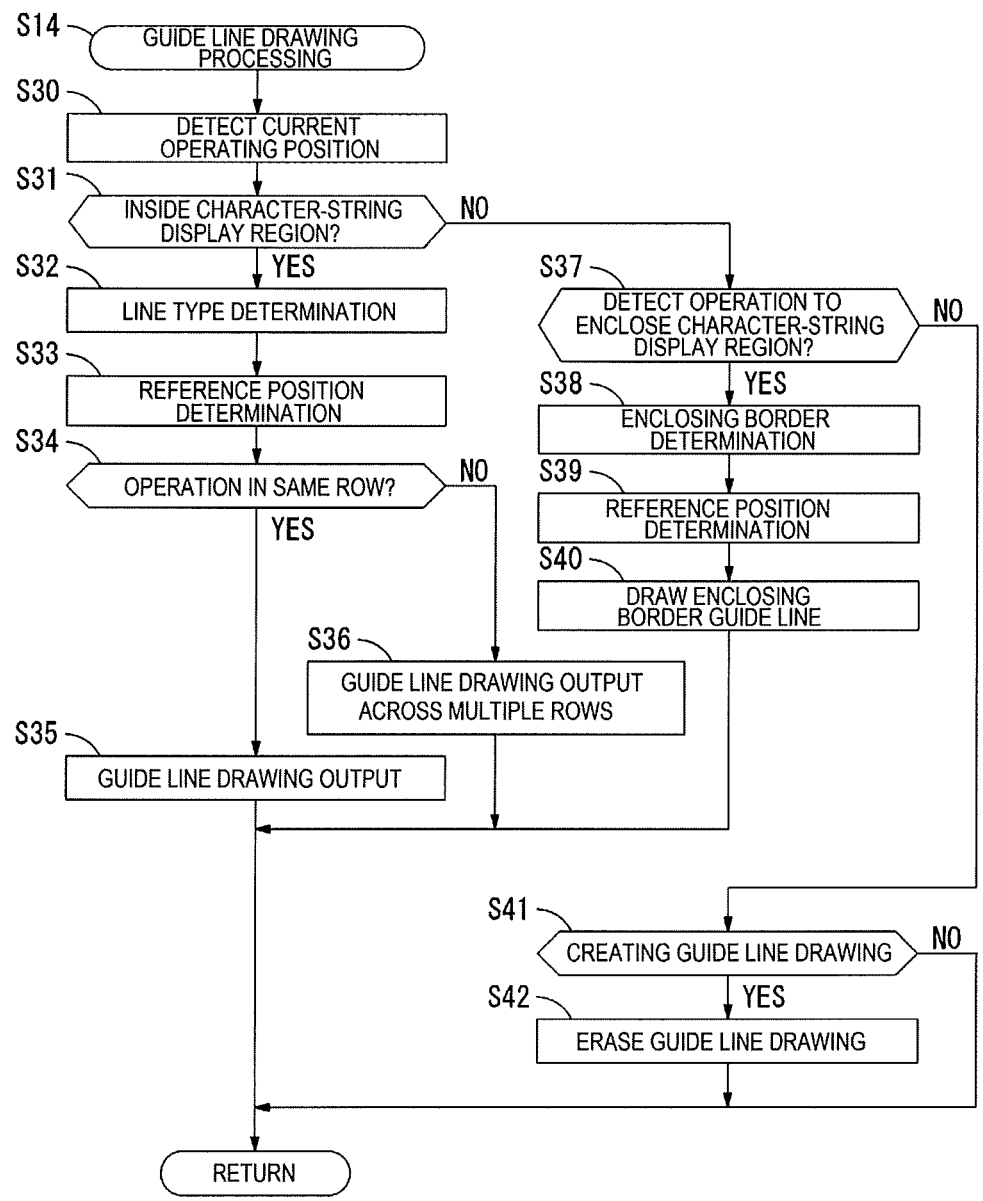
FIG. 17 is a flowchart showing an example of a detailed processing procedure of a guide line drawing process.

Next, a specific processing procedure performed in the document viewing apparatus 1 will be described. FIG. 16 and FIG. 17 are flowcharts showing an example of a processing procedure performed in the document viewing apparatus 1. This process is a process in which the CPU10a of the control unit 10 executes a program 16. When the processing is started, the document viewing apparatus 1 first starts operation of the document data acquisition unit 20 and reads document data 17 specified by the user (step S10). The document data acquisition unit 20 performs the character string detection process on the document data 17 and detects all character strings contained in the document data 17 (step S11). Thereafter, the document image is displayed based on the document data 17 with the display control unit 21 (step S12).

Thereafter, document reading apparatus 1 determines whether or not it is detected that the handwritten input operation by the user (step S13), and when detecting handwritten input operation (YES in step S13), and creates the guide line drawing (step S14). In the creation of the guide line drawing, a reference position of the character string is set based on the operating position PA2 of the handwritten input operation for the character string and the process of displaying a guide line 52 to the reference position is performed. Details about the guide line drawing processing will be described later.

The document viewing apparatus 1 determines whether or not the completion of the handwritten input operation by the user was detected or not (step S15). At this time, if the handwritten input operation by the user continues (at step S15 NO), whether or not the operating position PA2 was moved by the handwritten input operation is determined (step 16). If the operating position PA2 has moved (YES at step S16), and processing by the document viewing apparatus 1 returns to step S14 and repeats the creation of the guide line drawing. Accordingly, if the handwritten input operation by the user is continuously performed and movement of the operating position PA2 is detected, creation of the guide line drawing (step S14) is repeated. In the case where the operating position PA2 is not moved (NO in step S16) and returns to step S15, whether or not the handwritten input operation is completed is determined again. When the completion of the handwritten input operation is detected (YES in step S15), the document viewing apparatus 1 determines whether or not the guide line 52 is still being drawn (step S17). If the guide line 52 is being drawn (YES in step S17), the object assignment unit 25 in the document viewing apparatus 1 becomes operational and, based on the guide line 52 currently being displayed, an object 53 is assigned to the character string (step S18). Further, when the guide line 52 is not displayed upon completion of a handwritten input operation (NO in step S17), the object 53 is not assigned to the character string. For example, when a handwritten input operation by the user is away from the display region RD of the character string by more than a predetermined distance, it is not possible to identify the character string to assign a guide line and, therefore, the guide line 52 is not displayed. Even when the handwritten input operation is completed in such a state, the object for the character string is not assigned.

Then, the document viewing apparatus 1 determines whether or not the user has entered an instruction to terminate the viewing display of the document image (step S19). As a result, if an instruction to terminate the viewing display of the document image is entered (YES at step S19), processing by the document viewing apparatus 1 ends. In contrast, when an instruction to terminate the viewing display of the document image is not entered (NO at step S19), processing by the document viewing apparatus 1 returns to step S13 and repeats the above process.

FIG. 17 is a flowchart illustrating an example of a detailed processing procedure of the creation of the guide line drawing (step S14). When the document viewing apparatus 1 starts the guide line drawing processing, operation of the reference position determination unit 23 is started. The reference position determination unit 23 detects the current operating position PA2 of the handwritten input operation (step S30) and determines whether or not the operating position PA2 is located inside the display region RD of the character string (step S31). As a result, if the operating position PA2 is inside the display region RD of the character string (YES in step S31), the reference position determination unit 23 first performs line type determination (step S32). At this time, if there is no looping back 55 in the operation trace 51 of the handwritten input operation, the line type is determined to be a single line. In contrast, if there is a looping back 55 in the operation trace 51, the line type is determined to be a double line. Then, the reference position determination unit 23 sets the reference position when assigning guide line 52 to a character string (step S33). At this time, the reference position determination unit 23 may be set a reference position based on the current operating position PA2, and may also determine the reference position based on the operation trace 51. If handwritten input operation is continued after it is initiated, the reference position determining section 23 sets only the reference position for the character string in that row. In contrast, if a handwritten input operation crosses multiple lines, a reference position is set for each row of the character string.

Subsequently, the guide line drawing unit 24 in the document viewing apparatus 1 becomes operational. The guide line drawing unit 24 determines whether or not the handwritten input operation in the same row is still happening (step S34). If operation continues in the same row after handwritten input operation has started (YES in step S34), since only the reference position is set for the character string of the row, the guide line drawing unit 24 draws and displays a guide line 52 with respect to the reference position of the character string to which a handwritten input operation is currently being performed (step S35). In contrast, if the handwritten input operation across multiple lines is being performed (NO at step S34), because a reference position is set for each row of the multi-row character string, the guide line drawing unit 24 draws and displays a guide line 52 with respect to the reference position of each row of the character string included in the operation trace 51 (step S36).

On the other hand, if the current operating position PA2 is not inside the display region RD of the character string (NO in step S31), the reference position determination unit 23, based on the operation trace 51 of the handwritten input operation, determines whether or not the operation is an operation to enclose the display region RD of the character string (step S37). As a result, when the operation is an operation to enclose the display region RD of the character string (YES in step S37), the reference position determination unit 23 sets the enclosing border as the object 53 (step S38), and sets the first position BP1 at the bottom of the character string and the third position BP3 at the top reference positions (step S39). Thereafter, the guide line drawing unit 24 draws an enclosing border guide line 52 based on the operation trace 51 (step S40).

If the reference position determination unit 23 determine that the operation is not an operation to enclose the display region RD of the character string (NO in step S37), it is not possible to set any reference positions. In this case, the guide line drawing unit 24, currently, whether or not a guide line 52 is being drawn is determined (step S41), and if a guide line 52 is being drawn, the guide line 52 is erased (step S42). Accordingly, the operating position PA2 of the handwritten input operation separates from the character string by more than a predetermined distance, the guide line 52 that has been displayed so far is erased. Thus, the creation of the guide line drawing (step S14) is completed.

Thus, in the above-described process performed in the document viewing apparatus 1, when a handwritten input operation by the user is performed while the user is viewing a document image, it is possible to display a guide line 52 to an appropriate position with respect to the character string based on the handwritten input operation. Accordingly, when the user starts the handwritten input operation on the string, it is possible to proceed with the handwritten input operation while checking the guide line 52 to be displayed with it, it is possible for the user to know what object 53 will ultimately be assigned to the character string during the handwritten input operation. When the guide line 52 is not displayed in a desired manner, the user can change the e current handwritten input operation midway and display a guide line 52 in a desired manner. Furthermore, if the user completes the handwritten input operation when a desired guide line 52 is displayed, the guide line 52 is changed to the object 53 and can thus be assigned to the character string. With the document viewing apparatus 1 of the present embodiment, the operability when the user assigns an object 53 such as underline or strikethrough line while viewing a document image is remarkably improved.

When the document viewing apparatus 1 assigns an object 53 to a character string based on handwritten input operation by the user, the document data with object 53 appended can be made to overwrite the original document data 17 or the document data with object 53 appended can be saved separately from the original document data 17.

Having described the preferred embodiment of the present invention, the present invention is not intended to be limited to the contents described in the above embodiment and various modifications are applicable.

For example, in the above embodiment, the display region RD of the character string is partitioned into a first region R1 and a second region R2, and if handwritten input operation is detected in the first region R1, the guide line 52 for the character string is displayed at the position at which it will become an underline, and if the handwritten input operation is detected in the second region R2, the guide line 52 is displayed at the position at which it will become a strikethrough line. However, not limited to this, the document viewing apparatus 1 may, for example, be an apparatus that assigns only one of either an underline or a strikethrough line to a character string. In this case, there is no need to partition the display region RD of the character string into a first region R1 and second region R2.

Furthermore, the unit for detecting an enclosing border described in the above embodiment and the unit for detecting a double line are merely examples, and the unit may be a unit other than the unit explained in the above embodiment that detects an enclosing frame or a double line.

The above described embodiments make it possible to determine what kind of object is to be assigned to a character string by a handwritten input operation while a user is performing the handwritten input operation on the character string.

Although embodiments of the present invention have been described and illustrated in detail, it is clearly understood that the same is by way of illustration and example only and not limitation, the scope of the present invention should be interpreted by terms of the appended claims.

What is claimed is:

1. A document viewing apparatus, including a touch screen capable of receiving a handwritten input operation by a user when a document image is displayed on the touch screen, the apparatus comprising a hardware processor configured to:
   detect a character string included in the document image;
   set a reference position to the character string based on an operating position of an operation trace of the handwritten input operation performed on the character string;
   draw and display a guide line during the handwritten input operation in accordance with the reference position; and
   convert the guide line into an object in the document image with completion of the handwritten input operation,
   wherein the hardware processor is further configured to:
   define a display area of the character string that encloses the character string and extends in a direction of the character string;
   partition the display area into a first region and a second region with a dividing line extending parallel to the direction of the character string;
   set a first position in the character string as the reference position when determining that the operating position is positioned in the first region, and
   set a second position, different from the first position, as the reference position when determining that the operating position is positioned in the second region;
   wherein the hardware processor sets the reference position to the character string based on the operating position, wherein the operating position is a location where a pen or finger last touches the screen during the operation trace.

2. The document viewing apparatus according to claim 1, wherein the first region is a lower portion of the display area of the character string and the second region is an upper portion of the display area of the character string,
   and an underline object is assigned to the character string when the reference position is in the first region, and a strikethrough line object is assigned to the character string when the reference position is in the second region.

3. The document viewing apparatus according to claim 1, wherein a relative size of the first region and of the second region of the display region of the character string can be changed based on a setting operation by the user.

4. The document viewing apparatus according to claim 1, wherein the hardware processor, when the handwritten input operation is performed over multiple rows of a character string, sets reference positions for each row in accordance with the operating position.

5. The document viewing apparatus according to claim 1, wherein the hardware processor, when drawing and displaying the guide line, makes a start point or an end point of the guide line coincide with a break of words in the character string.

6. The document viewing apparatus according to claim 1, wherein the hardware processor is configured to draw and display the guideline in one format and then change the format of the guideline when the guideline is converted to the object.

7. A document viewing apparatus, including a touch screen capable of receiving a handwritten input operation by a user when a document image is displayed on the touch screen, the apparatus comprising a hardware processor configured to:
   detect a character string included in the document image;
   set a reference position to the character string based on an operation trace of the handwritten input operation performed on the character string;
   draw and display a guide line during the handwritten input operation in accordance with the reference position; and
   convert the guide line into an object in the document image with completion of the handwritten input operation,
wherein the hardware processor is further configured to:
   define a display area of the character string that encloses the character string and extends in a direction of the character string;
   partition the display area into a first region and a second region with a dividing line extending parallel to the direction of the character string;
   set a first position in the character string as the reference position when determining that more of the operation trace is in the first region than in the second region, and
   set a second position, different from the first position, as the reference position when determining that more of the operation trace is in the second region than in the first region.

8. The document viewing apparatus according to claim 7, wherein the hardware processor, in the period from start to completion of the handwritten input operation, successively updates the guide line in accordance with the operation trace.

9. The document viewing apparatus according to claim 7, wherein the hardware processor, when detecting an operation trace enclosing the display region of a character string, sets the enclosing border as the object, and sets reference positions at the top and bottom positions of the character string.

10. The document viewing apparatus according to claim 7, wherein the hardware processor, when detecting a looping back of the operation trace by the handwritten input operation, sets a double line as the object,
   and the hardware processor, along with setting the object as a double line, draws and displays the guide line as a double line.

11. The document viewing apparatus according to claim 7, wherein the hardware processor sets the reference position to the character string based on a location of the operation trace.

12. A non-transitory recording medium storing a computer readable program causing a document viewing apparatus, having a touch screen and receiving a handwritten input operation by a user when displaying a document image on the touch screen; to perform:
   detecting a character string included in the document image,
   setting a reference position based on an operating position or operation trace of the handwritten input operation performed on the character string, wherein the operating position is a location where a pen or finger last touches the screen during the operation trace,
   drawing and displaying a guide line during the handwritten input operation in accordance with the reference position,
   and with a completion of the handwritten input operation, converting the guide line into an object in the document image,
wherein the document viewing apparatus is also caused to perform one of (1) and (2) below:
(1)
defining a display area of the character string that encloses the character string and extends in a direction of the character string;
partitioning the display area into a first region and a second region with a dividing line extending parallel to the direction of the character string;
setting a first position in the character string as the reference position when determining that the operating position is positioned in the first region, and
setting a second position, different from the first position, as the reference position when determining that the operating position is positioned in the second region, and
(2)
defining a display area of the character string that encloses the character string and extends in a direction of the character string;
partitioning the display area into a first region and a second region with a dividing line extending parallel to the direction of the character string;
setting a first position in the character string as the reference position when determining that more of the operation trace is in the first region than in the second region, and
setting a second position, different from the first position, as the reference position when determining that more of the operation trace is in the second region than in the first region.

13. The non-transitory recording medium storing a computer readable program according to claim 12, wherein the document viewing apparatus is caused to perform (1).

14. The non-transitory recording medium storing a computer readable program according to claim 13, wherein the first region is a lower portion of the display region of the character string and the second region is an upper portion of the display region of the character string,
   an underline object is assigned to the character string when the reference position is in the first region, and a strikethrough line is assigned to the character string when the reference position is in the second region.

15. The non-transitory recording medium storing a computer readable program according to claim 13, wherein a relative size of the first region and the second region, with respect to the display region of the character string, is changed based on a setting operation by the user.

16. The non-transitory recording medium storing a computer readable program according to claim 12, wherein the document viewing apparatus is caused to perform (2).

17. The non-transitory recording medium storing a computer readable program according to claim 12, when drawing the guide line in accordance with the operation trace with respect to the reference position, in a period from the start to the end of a handwritten input operation, a guide line is successively updated in accordance with an operation trace.

18. The non-transitory recording medium storing a computer readable program according to claim 12, when setting the reference position when assigning objects to the character string, and when a handwritten input operation is performed over multiple rows of a character string, a reference position for each row is set in accordance with an operating position.

19. The non-transitory recording medium storing a computer readable program according to claim 12, when setting the reference position when assigning objects to the character string, and when an operation trace enclosing the display area of a character string is detected, the enclosing border is set as an object, and the top and bottom positions of the character string are set as reference positions.

20. The non-transitory recording medium storing a computer readable program according to claim 12, when setting the reference position when assigning objects to the character string, and when a looping back of an operation trace by a handwritten input operation is detected, the double line is set as an object;

and when drawing the guide line in accordance with the operation trace with respect to the reference position, and when the object being set as a double line, the guide line is drawn and displayed as a double line.

21. The non-transitory recording medium storing a computer readable program according to claim 12, when drawing the guide line in accordance with the operation trace with respect to the reference position, and when drawing and displaying the guide line, the start point or end point of the guide line is made to coincide with the break of the word in the character string.

* * * * *